United States Patent
Domenico

[15] 3,692,792
[45] Sept. 19, 1972

[54] HALOPYRIDINE SULFENYL-AND SULFONYLHALIDES

[72] Inventor: Penelope B. Domenico, Danville, Calif.

[73] Assignee: The Dow Chemical Company, Midland, Mich.

[22] Filed: May 20, 1971

[21] Appl. No.: 145,507

Related U.S. Application Data

[62] Division of Ser. No. 861,463, Sept. 26, 1969, Pat. No. 3,635,994.

[52] U.S. Cl. ......260/294.8 G, 260/294.8 F, 424/263
[51] Int. Cl. .............................................C07d 31/50
[58] Field of Search..................260/294.8 F, 294.8 G

[56] References Cited

UNITED STATES PATENTS

| | | | |
|---|---|---|---|
| 3,296,272 | 1/1967 | Johnston | 260/294.8 |
| 3,415,832 | 12/1968 | Crawford | 260/294.8 |
| 3,475,441 | 10/1969 | Levine | 260/294.8 |
| 3,535,328 | 10/1970 | Zielinski | 260/294.8 X |

*Primary Examiner*—Alan L. Rotman
*Attorney*—Griswold and Burdick

[57] ABSTRACT

This disclosure is directed to sulfur containing substituted pyridine compounds corresponding to the formula

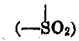

wherein D represents chlorine, bromine or fluorine; M represents sulfenyl (—S—) or sulfonyl

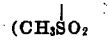

and Py represents one of the substituted pyridyl radicals

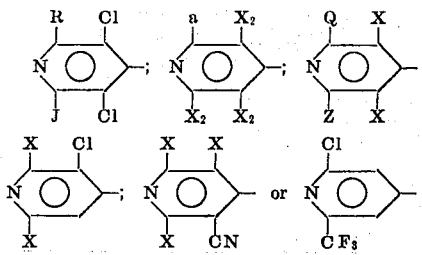

in which $X_2$ represents bromine or fluorine; X represents chlorine or $X_2$; a represents hydrogen or $X_2$; R represents hydrogen or X; J represents trichloromethyl, trifluoromethyl or R; Q represents methyl sulfonyl $(CH_3SO_2$ or R and Z represents cyano (—CN) or methyl sulfonyl, with the proviso that D is fluorine only when M is sulfonyl. The preparation and use of these compounds as pesticides is also disclosed.

2 Claims, No Drawings

HALOPYRIDINE SULFENYL- AND SULFONYLHALIDES

CROSS-REFERENCE TO RELATED APPLICATION

This application is a division of our co-pending application, Ser. No. 861,463, filed Sept. 26, 1969, now U.S. Pat. No. 3,635,994 dated Jan. 18, 1972.

SUMMARY OF THE INVENTION

The present invention is directed to pyridine compounds corresponding to the formula $$P_y - M - D$$

In this and succeeding formula, D represents chlorine, bromine or fluorine; M represents sulfenyl (—S—) or sulfonyl

$P_y$ represents one of the substituted pyridyl radicals

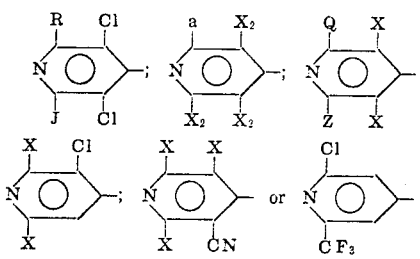

in which $X_2$ represents bromine or fluorine; X represents chlorine or $X_2$; a represents hydrogen or $X_2$; R represents hydrogen or X; J represents trichloromethyl, trifluoromethyl or R; Q represents methyl sulfonyl

or R and Z represents cyano (—CN) or methyl sulfonyl, with the proviso that D is fluorine only when M is sulfonyl.

For convenience, those compounds of the present invention wherein M represents the sulfide group (—S—) are identified as halopyridyl sulfenylhalides and those compounds wherein M represents the sulfonyl group

are identified as halopyridyl sulfonylhalides.

The pyridine compounds of the present invention are crystalline solids or oils which are of low solubility in water and of moderate solubility in common organic solvents. The compounds are useful as pesticides in the control of various pests such as bacteria, fungi, undesired terrestrial plants and insects.

The compounds of the present invention are prepared by a variety of methods. The halopyridyl sulfenylhalides are prepared by reacting chlorine or bromine with a halopyridine mercaptan of formula

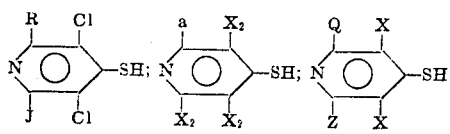

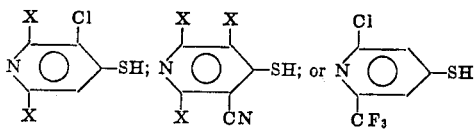

wherein R, J, a, X, $X_2$, Q and Z are as hereinbefore defined, whereby the corresponding halopyridylsulfenyl bromide or chloride is obtained.

In carrying out this reaction, the halopyridine mercaptan is slowly added to an agitated solution of carbon tetrachloride or other solvent, such as, for example, dichloromethane or benzene, each saturated with chlorine or bromine. The reaction proceeds readily under ambient conditions of temperature and pressure. However, temperatures of from about minus 10° to about 60° C. are conveniently employed. The amount of the reactants to be employed is not critical, some of the product being formed when employing any proportions. The reaction consumes the reactants, however, in the ratio of one mole of the halopyridyl mercaptan per mole of halide and the employment of such proportions is preferred.

After the addition of the halopyridine mercaptan is complete, the reaction mixture is maintained under agitation for a short period of time, up to about 60 minutes to insure completion of the reaction. The solvent is removed by evaporation, aspiration or other convenient separatory procedure. The so-recovered product, if desired, can be further purified by recrystallization from a suitable solvent, for example, hexane, benzene or a hexane-benzene mixture.

The halopyridyl sulfonylhalides are prepared by contacting the above-prepared halopyridyl sulfenylhalide with either bromine or chlorine and water. The specific halogen employed should correspond to the halide of the starting material, i.e., if the starting material is a sulfenyl chloride, chlorine gas is employed and if the starting material is a sulfenyl bromide, liquid bromine is employed. In carrying out this reaction, the halopyridyl sulfenylhalide is dissolved in a solvent such as carbon tetrachloride or trichloroacetic acid and this solution mixed with water. This mixture is maintained under agitation and the bromine or chlorine introduced thereto. In an alternative method, the halopyridyl sulfenylhalide is added to an agitated mixture of one of the above-named solvents and water followed by the introduction of bromine or chlorine. Following the reaction, the desired product can be separated in substantially quantitative yields by decantation or filtration. The reaction conditions are not critical and the temperature can be from about minus 10° to about 35° C. This type of oxidation is further discussed in U.S. Pat. No. 3,415,832. The oxidation of one molecule of the sulfenyl halide to the corresponding sulfonyl halide requires two atoms of oxygen. Usually the oxidizing agent is employed in molar proportions which will provide oxygen in at least stoichiometric amounts. In general, the chlorine or bromine is passed in to the aqueous system at a reaction temperature of about minus 10° to about 10° C. until an equilibrium conversion to the sulfonylhalide has been approximated, i.e., for a period of from about 2 to about 4 hours.

The reaction is terminated by stopping the chlorine addition and the solvent layer separated and dried with a dessicant such as anhydrous sodium sulfate. The solvent is stripped by aspiration under vacuum and the resulting product removed.

When a halopyridyl sulfonylfluoride is the desired product, it is prepared by conventional halide exchange between the sulfonylchloride or bromide (as prepared hereinbefore) and potassium fluoride. In carrying out this exchange, the halopyridyl sulfonylchloride or bromide is mixed with an aqueous solution of potassium fluoride, usually having a KF content of between 50 to 75 weight percent. This mixture is refluxed at the boiling point of the mixture for a period of from about 5 to about 30 minutes, cooled and extracted with a solvent such as benzene, hexane, carbon tetrachloride or dichloromethane. Any insoluble material in the extracted portion is removed by filtration and the extract dried by conventional means such as by the use of a dessicant such as anhydrous sodium sulfate. The solvent is then removed leaving the desired product. When the final product is a solid, it is usually recrystallized from a solvent such as pentane, hexane, or chloroform.

DESCRIPTION OF PREFERRED EMBODIMENTS

The following examples illustrate the present invention and the manner by which it can be practiced, but as such, should not be construed as limitations upon the overall scope of the same.

EXAMPLE 1

2,3,5-trichloro-4-pyridine sulfenyl chloride

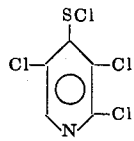

Chlorine gas is bubbled into 350 milliliters of carbon tetrachloride until 3.3 grams of chlorine has been taken up by the carbon tetrachloride. To this agitated solution is added portionwise over a 15-minute period, 10 grams (0.05 mole) of 2,3,5-trichloro-4-pyridyl mercaptan. Agitation is maintained until all of the mercaptan is dissolved. The carbon tetrachloride is removed by aspiration leaving the 2,3,5-trichloro-4-pyridine sulfenyl chloride product in a yield of 9.0 grams (78 percent of theoretical). The product is an oil and is found by analysis to have carbon, hydrogen, chlorine, nitrogen and sulfur contents of 24.23, 0.55, 56.88, 5.52 and 12.77 percent, respectively, as compared with the theoretical contents of 24.10, 0.40, 57.10, 5.65 and 12.90 percent, respectively, calculated for the above-named structure.

EXAMPLE 2

2,3,5,6-tetrachloro-4-pyridine sulfenyl chloride

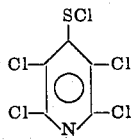

Chlorine gas is bubbled into 350 milliliters of carbon tetrachloride under agitation until it turns a dark yellow in color. To this agitated solution is added 15 grams (.06 mole) of 2,3,5,6-tetrachloro-4-pyridyl mercaptan portionwise and agitation is maintained until all of the solids are completely dissolved. The carbon tetrachloride is removed by aspiration leaving the 2,3,5,6-tetrachloro-4-pyridine sulfenyl chloride product in a yield of 16.9 grams (100 percent of theoretical). The product has a melting point of 56° C. and is found by analysis to have carbon, chlorine, nitrogen and sulfur contents of 21.43, 62.26, 5.05 and 11.18 percent, respectively, as compared with the theoretical contents of 21.30, 62.50, 4.95 and 11.3 percent, respectively, calculated for the above-named structure.

EXAMPLE 3

2,3,5-trichloro-6-cyano-4-pyridine sulfenyl chloride

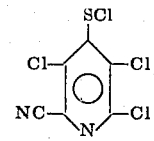

To a chlorine saturated solution of carbon tetrachloride is added portionwise, while chlorine is continuously bubbled therein, 10 grams (.04 mole) of 2,3,5-trichloro-6-cyano-4-pyridyl mercaptan. After the mercaptan addition is complete, chlorine addition is ceased. The carbon tetrachloride is removed by aspiration leaving the 2,3,5-trichloro-6-cyano-4-pyridine sulfenyl chloride product in a yield of 11.45 grams (100 percent of theoretical). The product is found by analysis to have carbon, chlorine, nitrogen and sulfur contents of 24.97, 50.08, 10.85 and 11.24 percent, respectively, as compared with the theoretical contents of 26.30, 51.80, 10.22 and 11.70 percent, calculated for the above-named structure.

EXAMPLE 4

2,3,5,6-tetrachloro-4-pyridine sulfonyl chloride

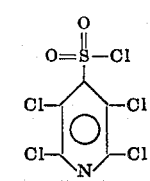

Chlorine gas is continuously bubbled into an agitated solution of 10 grams (0.04 mole) of 2,3,5,6-tetrachloro-4-pyridine sulfenyl chloride (prepared as in Example 2 above) in 100 milliliters of carbon tetrachloride and 100 milliliters of water for a period of 2 ½ hours at a temperature of between 0° and 10° C. The carbon tetrachloride layer is separated from the aqueous layer and dried with anhydrous sodium sulfate. The carbon tetrachloride is removed by vacuum aspiration and the residue is recrystallized from hexane to recover the 2,3,5,6-tetrachloro-4-pyridine sulfonyl chloride product in a yield of 10 grams (90 percent of theoretical). The product has a melting point of 59.7° C. and is found by analysis to have carbon, chlorine, nitrogen and sulfur contents of 19.20, 56.02, 4.48 and 9.96 percent, respectively, as compared with the theoretical contents of 19.00, 56.10, 4.45 and 10.20 percent, respectively, calculated for the above-named product.

EXAMPLE 5

2,3,5,6-tetrachloro-4-pyridine sulfonyl fluoride

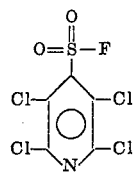

A mixture is prepared by adding 5.5 grams (0.02 mole) of 2,3,5,6-tetrachloro-4-pyridine sulfonylchloride (prepared as in Example 4 above) to 20 milliliters of a 73 percent solution of potassium fluoride. The reaction mixture is refluxed for 15 minutes at about 100° C., cooled and extracted with benzene. Solids are removed by filtration and the remaining benzene solution dried with anhydrous sodium sulfate. The benzene is removed by evaporation and the residue remaining mixed with pentane. The 2,3,5,6-tetrachloro-4-pyridine sulfonyl fluoride product is recrystallized therefrom and recovered in a yield of 3 grams (57.8 percent of theoretical). The product has a melting point of 57°–58.5° C. and is found by analysis to have carbon, chlorine, nitrogen, sulfur and fluorine contents of 20.72, 47.54, 4.64, 10.51 and 6.65 percent, respectively, as compared with the theoretical contents of 29.09, 47.44, 4.69, 10.72 and 6.36 percent, respectively, calculated for the above-named structure.

The following compounds of the present invention are prepared in accordance with the methods herein set forth (M.W. designates molecular weight).

2-trichloromethyl-3,5-dichloro-4-pyridinesulfenyl chloride M.W 331.89
2-trichloromethyl-3,5-dichloro-4-pyridinesulfonyl chloride M.W. 363.89
2,6-dibromo-3-cyano-5-chloro-4-pyridinesulfenyl chloride M.W. 362.89
2,6-difluoro-3,5-dichloro-4-pyridinesulfonyl chloride M.W. 342.50
2,3,5,6-tetrabromo-4-pyridinesulfonyl bromide, M.W. 505.72
2,3,5,6-tetrabromo-4-pyridinesulfonyl fluoride, M.W. 476.80
2,6-dimethylsulfonyl-3,5-dichloro-4-pyridinesulfonyl chloride M.W. 402.66
2-methylsulfonyl-3,5,6-tribromo-4-pyridinesulfenyl bromide M.W. 504.88
2-methylsulfoyl-3,5,6-trichloro-4-pyridinesulfenyl chloride, M.W. 262.97
2,3,5-trichloro-6-cyano-4-pyridinesulfenyl chloride, M.W. 451.79
2-trifluoromethyl-3,5-dichloro-4-pyridinesulfenyl chloride M.W. 282.51
2-trifluoromethyl-6-chloro-4-pyridinesulfenyl chloride M.W. 246.05
2,5,6-trifluoro-3-cyano-4-pyridinesulfonyl fluoride M.W. 238.13
2,3,5,6-tetrafluoro-4-pyridinesulfonyl fluoride, M.W. 233.12
2,5-dichloro-6-bromo-4-pyridinesulfonyl fluoride, M.W. 308.96
2,6-dibromo-5-chloro-4-pyridinesulfenyl chloride, M.W. 351.87
2-bromo-5-chloro-6-fluoro-4-pyridinesulfenyl chloride, M.W. 276.96.

In accordance with the present invention, it has been discovered that the halopyridyl sulfenyl- and sulfonyl-halide compounds can be employed as pesticides for the control of many bacterial, terrestrial and aquatic plants, fungal and insect pests. They can be applied to the aerial portions of many growing plants to control leaf-attacking fungal organisms or dispersed in soil or applied to plant seeds to control the root and seed attacking organisms of mold and damping off. In still other operations they can be applied to orchard floor surfaces to control over-wintering spores of many fungal organisms. In still further operations, the compounds of the invention or compositions containing them as toxic constituents can be included in and on plaster, ink, wallboard, textiles, paper, adhesives, soaps, synthetic detergents, cutting oils, polymeric materials, embalming fluids, oil paints and latex paints to prevent the attack of various fungal pests and the subsequent economic loss due to the degradation of such products by microorganisms. Also, the compounds can be distributed in textiles, cellulosic materials or in grain or can be employed in the impregnation of wood and lumber to preserve and protect such products from the attack of the organisms of rot, mold and decay. They also can be employed as a toxicant to control insect pests.

The exact concentration of the toxicant to be employed in the treating compositions is not critical and may vary considerably provided the required dosage of the effective agent is supplied in the ink, adhesive, soap, cutting oil, polymeric material, paint, textile, paper, wood or growth medium or upon plant foliage or insects. The concentration of toxicant in liquid compositions generally is from about 0.0001 to 50 percent by weight. Concentrations up to 95 percent by weight are oftentimes conveniently employed, particularly in concentrate compositions. In dusts, the concentrations of the toxicant can be from about 0.1 to 95 percent by weight. In compositions to be employed as concentrates, the toxicants can be present in a concentration of from 5 to 98 percent by weight. For use as a foliar spray or in seed treatment, it is often convenient to apply the compounds as wettable powders.

In a representative operation, each of the compounds 2,3,5-trichloro-4-pyridinesulfenyl chloride, 2,3,5,6-tetrachloro-4-pyridinesulfenyl chloride, 2,3,5-trichloro-6-cyano-4-pyridinesulfenyl chloride and 2,3,5,6-tetrachloro-4-pyridinesulfonyl fluoride, when employed as the sole toxicant in a nutrient agar at a concentration of about 500 parts by weight of the compound per million parts of agar, is found to give 100 percent kill and control of the organism Staphylococcus aureus. The compounds 2,3,5,6-tetrachloro-4-pyridinesulfonyl fluoride and 2,3,5-trichloro-6-cyano-4-pyridinesulfenyl chloride, when employed at the same toxicant concentration and nutrient agar, give 100 percent kill and control of the organism Trichophyton mentagrophytes. Candida albicans, Bacillus subtilis, Pullularia pullulans and Mycobacterium phlei. In each of the above determinations, a check nutrient agar containing no toxicant, supports a heavy growth of the test organisms.

In an additional operation, 2,3,5-trichloro-6-cyano-4-pyridinesulfenyl chloride is found to give 100 percent kill and control of the organisms Aspergillus terreus and Candida Pelliculosa when employed at the same toxicant concentration and nutrient agar. In another operation, 2,3,5-trichloro-6-cyano-4-pyridine-sulfenyl chloride and 2,3,5,6-tetrachloro-4-pyridine-sulfenyl chloride are also found to give 100 percent kill and control of the organism Rhizopus nigricans. In each of the above determinations, the toxicant concentration and nutrient agar are as above and in each, the check nutrient agar supports a heavy growth of the test organisms.

In another representative operation, aqueous dispersions of 2,3,5-trichloro-4-pyridinesulfenyl chloride at a concentration of 100 parts per million by weight, give substantially complete kills of citrus green mold, potato scab fungus and B. cereus soil bacterium.

In other representative operation, 2,3,5,6-tetrachloro-4-pyridinesulfonyl fluoride, when employed as the sole toxicant in an aqueous composition at a concentration of 100 parts per million by weight, gives 100 percent kill of two-spotted spider mite.

In other operations, aqueous compositions of the compound 2,3,5-trichloro-4-pyridinesulfenyl chloride as the only active toxicant at a concentration of 10 pounds per acre give 100 percent kill and control of oats and at a concentration of 4,000 parts per million by weight gives substantially complete kill and control of crabgrass, tomato, corn, beans and wild oats.

PREPARATION OF STARTING MATERIALS

The polyhalopyridine mercaptans employed as starting materials are prepared by reacting a polyhalopyridine of one of the formulas

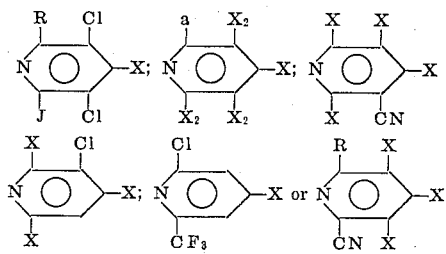

wherein R, J, $a$, X and $X_2$ are as hereinbefore defined, with an alkali metal sulfide at temperatures of from 65° to 110° C. in the presence of a solvent. The alkali metal salt of the pyridine can be easily converted to the corresponding mercaptan by dispersing the salt in an acid aqueous media whereupon the free halopyridyl —SH compound will precipitate. The starting materials can also be prepared by reacting a polyhalopyridine, as defined above, with sodium or potassium hydrosulfide or with the monohydrate of sodium or potassium sulfide under the same conditions as hereinabove set forth and recovering the desired product. These preparations are further described in U.S. Pat. No. 3,364,223.

The polyhalopyridine mercaptan of the formula

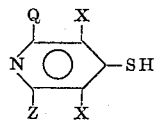

wherein Q and X are as hereinbefore defined and Z is methyl sulfonyl, employed as a starting material is prepared by reacting a 2,5-dihalo-4,6-bis(methyl sulfonyl) pyridine or a 2,4,6-tris(methyl sulfonyl)-3,5-dihalo pyridine with either an alkali metal sulfide or an alkali metal hydrosulfide under the same conditions as hereinabove set forth.

The 2,5-dihalo-4,6-dimethyl sulfonyl pyridine and the 3,5-dihalo-2,4,6-tris(methyl sulfonyl) pyridine starting materials are prepared by reacting in a polar organic solvent, a halopyridine compound of the formula

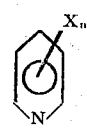

wherein X is as hereinbefore defined and n represents integer of 3 to 5, with an alkali metal salt of methyl mercaptan ($CH_3SNa$) at a temperature of from about 50° to about 150° C. and in a molar ratio of 2 to 3 moles of the alkali metal mercaptan per mole of the halopyridine, depending upon whether the bis- or tris thio halopyridine is desired. The product of this reaction is oxidized to convert the thio group to the sulfonyl group. This preparation is further described in co-pending U.S. application, Ser. No. 780,896.

The polyhalopyridine mercaptan of the formula

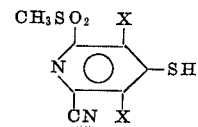

wherein X is as hereinbefore defined can be prepared by the conversion of a polyhalocyanopyridine with either an alkali metal sulfide or an alkali metal hydrosulfide as hereinabove set forth to exchange the 4 position halogen atom for a —SH group. The product is further reacted with an alkali metal salt of methyl mercaptan in a mole to mole ratio and in the presence of a polar organic solvent as hereinabove set forth to exchange the 6 position halogen with a —SCH₃ group. This product is subsequently oxidized to convert the —SCH₃ group to —SO₂CH₃ under conditions as hereinbefore set forth.

The polyhalocyanopyridines employed as starting materials can be prepared by the method of U.S. Pat. No. 3,325,503 wherein a cyano-substituted pyridine is chlorinated with chlorine gas in vapor phase operations employing a carbon catalyst activated with barium chloride at a temperature of about 300°–400° C. The polyhalocyanopyridine can then be converted to the bromo or fluoro or partial bromo or fluoro cyanopyridine counterparts employing known techniques of halide exchange, wherein the above-identified tetrachlorocyanopyridines are treated with gaseous hydrogen bromide in an acid medium or with potassium fluoride in a polar solvent and conveniently at the boiling temperature and under reflux.

Following the exchange, the desired product is separated by conventional procedures such as washing with water, extraction and fractional distillation.

The cyano-substituted pyridines employed to prepare the polyhalocyanopyridines are commercially available or may be prepared by the ammoxidation of methylpyridine as described in Chemical Engineering Progress, Sept. 1964, pages 48–49.

The 2,3,4-trichloropyridine, 2,3,4,5-tetrachloropyridine, 2,3,4,6-tetrachloropyridine and 2,3,4,5,6-pentachloropyridine employed an above described can be prepared in known procedures by conventional liquid or vapor phase techniques for the halogenation of pyridine or halopyridines such as those taught in U.S. Pat. Nos. 1,977,662 and 3,186,994 and in Sell; J. Chem. Soc., Vol. 93, pp. 1993–5 (1908). 2,3,4,5-tetrachloropyridine, 2,3,4,6-tetrachloropyridine and 2,3,4,5,6-pentachloropyridine can also be prepared in known procedures by the halogenation of pyridine in glacial acetic acid and preferably at the boiling temperature of the mixture.

The tri-, tetra- or penta.fluoropyridines are prepared by conventional halide exchange between the corresponding chloro or bromo pyridines and potassium fluoride.

The pentabromopyridine starting material can be prepared by known procedures for vapor phase bromination of pyridine. Similar mixed halopyridines wherein one or both of the 2- and 4- and/or 6-positions are occupied by bromine and/or fluorine are also employed in the production of various starting materials. These products are readily obtained in known procedures wherein the above-identified tetrachloropyridines and pentachloropyridines are treated with gaseous hydrogen bromide or hydrogen fluoride in glacial acetic acid, conveniently at the boiling temperature and under reflux. Following the exchange, the desired product is separated by conventional procedures such as washing with water, extraction and fractional distillation. Other methods for preparing mixed halopyridines are taught in U.S. Pat. No. 3,371,011.

What is claimed is:

1. A compound corresponding to the formula

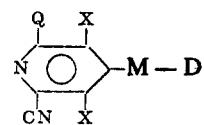

wherein D represents chlorine, bromine or flourine; m represents sulfenyl (—S—) or sulfonyl (—SO₂); Q represents hydrogen, chloro or methylsulfonyl; X represents chlorine, bromine or fluorine, with the proviso that D is fluorine only when M is sulfonyl.

2. A compound of claim 1 which is 2,3,5-trichloro-6-cyano-4-pyridinesulfenyl chloride.

* * * * *

UNITED STATES PATENT OFFICE
CERTIFICATE OF CORRECTION

Patent No. 3,692,792     Dated September 19, 1972

Inventor(s) Penelope B. Domenico

It is certified that error appears in the above-identified patent and that said Letters Patent are hereby corrected as shown below:

Column 5, line 29, strike "29.09" and substitute --20.09--.
      line 52, strike "methylsulfoyl" and substitute --methylsulfonyl--.

Signed and sealed this 18th day of December 1973.

(SEAL)
Attest:

EDWARD M. FLETCHER, JR.
Attesting Officer

RENE D. TEGTMEYER
Acting Commissioner of Patents